Figure 3:
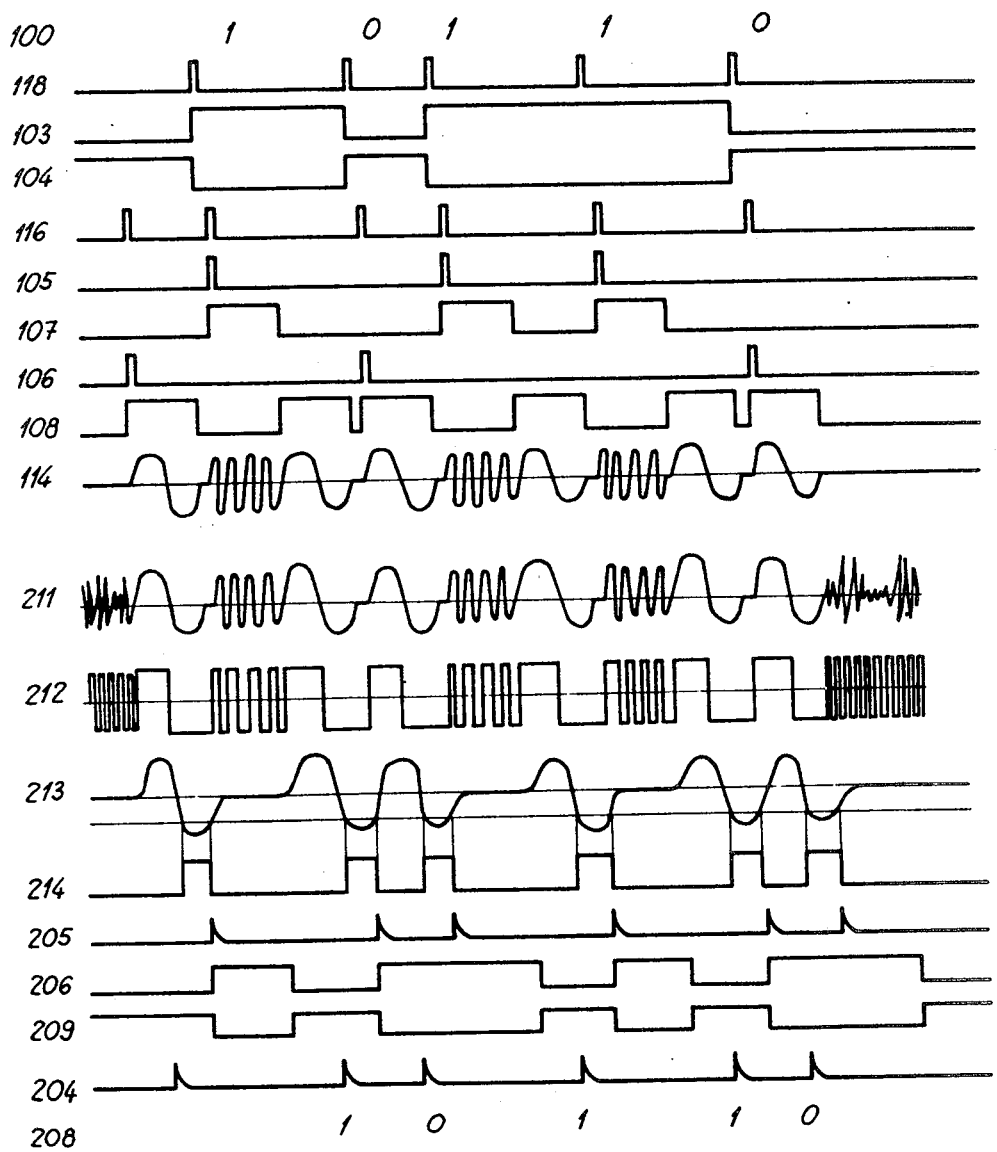

United States Patent [19]

Masur

[11] Patent Number: 4,464,766
[45] Date of Patent: Aug. 7, 1984

[54] RADIO TRANSMISSION SYSTEM FOR BINARY CODED SIGNALS

[75] Inventor: Christian Masur, Lommiswil, Switzerland

[73] Assignee: Autophon A.G., Canton of Soleure, Switzerland

[21] Appl. No.: 383,140

[22] Filed: May 28, 1982

[51] Int. Cl.³ .......................................... H04L 27/10
[52] U.S. Cl. ................................ 375/49; 340/825.73
[58] Field of Search ...................... 340/825.72, 825.73, 340/825.75; 375/49, 90, 45; 455/36

[56] References Cited

U.S. PATENT DOCUMENTS 2,929,921 3/1960 Clark, Jr. ............................... 455/36
3,555,428 1/1971 Perreault ................................ 375/49
3,632,876 1/1972 Bench ..................................... 375/49

Primary Examiner—Benedict V. Safourek
Attorney, Agent, or Firm—Pearne, Gordon, Sessions, McCoy, Granger & Tilberry

[57] ABSTRACT

Binary digits of one kind are each converted into a single, complete sinusoidal oscillation of a lower frequency, and binary digits of the other kind are each converted into a train consisting of an oscillation packet of a higher frequency and a single, complete sinusoidal oscillation of the lower frequency. At the receiving end, only a comparator as limiter, a low-pass filter, and a threshold-value detector are necessary to produce from the transmitted signal a train of pulses of equal length separated by spaces of different lengths. From this pulse train, the binary digits can easily be derived. Because of the simplicity of the equipment at the receiving end, the system is particularly suitable for transmitting data from one transmitter to a large number of receivers.

6 Claims, 4 Drawing Figures

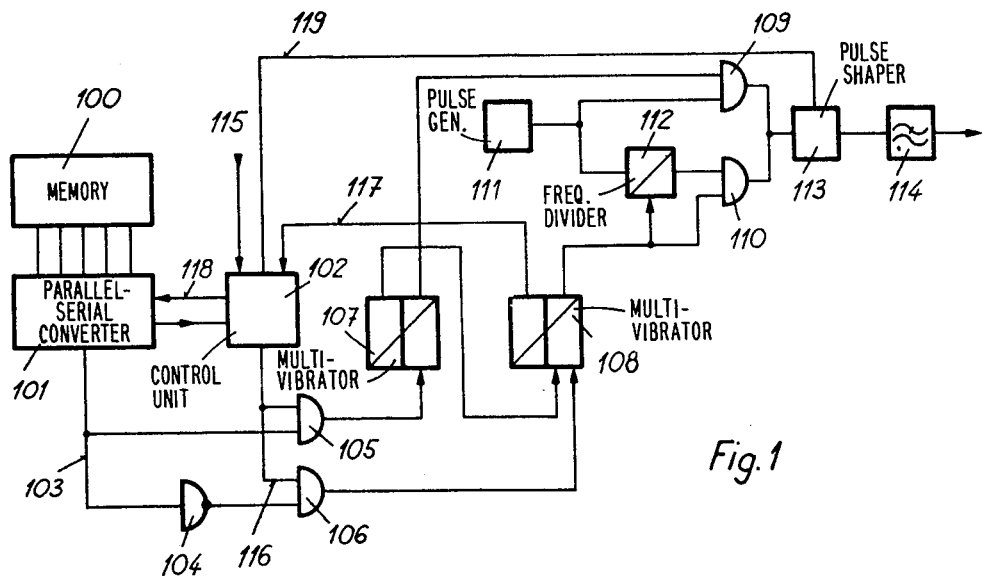
Fig. 1
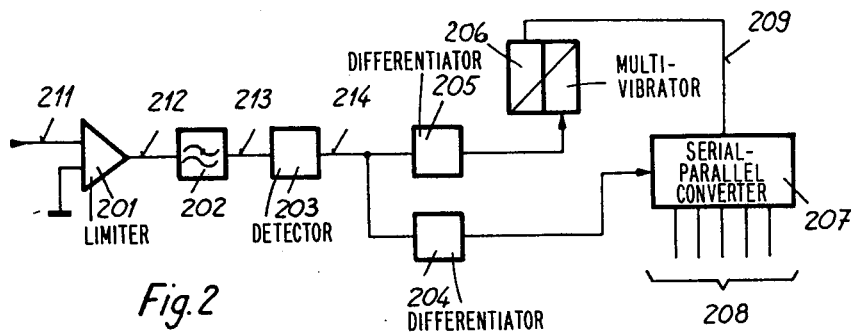
Fig. 2
Fig. 4

RADIO TRANSMISSION SYSTEM FOR BINARY CODED SIGNALS

This invention relates to the transmission of binary coded signals by radio. More particularly, it relates to a system of the type having circuit means at the transmission end which convert the binary coded signal in a suitable manner into a signal which can be modulated upon a radio-frequency signal by any type of modulation appropriate for the transmission of analog signals, and circuit means at the receiving end which demodulate the RF signal and supply the demodulated signal to a limiter which produces a bipolar signal dependent upon the momentary polarity of the signal applied thereto.

In conventional systems for the radio transmission of binary coded signals, frequency-shift keying (FSK) is used, in that one of two relatively close-lying frequencies is assigned to each of the binary digits, and these two frequencies are alternately modulated in some way, in accordance with the signal to be transmitted, upon a radio-frequency carrier which is then sent out. At the receiving end, the RF signal is demodulated, and the resultant low-frequency signal containing the aforementioned two frequencies is reconverted, with the aid of two band-pass filters tuned to these frequencies, into the binary digits to be transmitted. Here the speed of transmission is limited by the transient time of the band-pass filters, which is in turn related to the necessary circuit Q. This circuit Q, in its turn, is dependent upon the difference between the frequencies corresponding to the two binary digits.

It has been proposed to reduce the large bandwith needed for the transmission in any manner of a rectangular signal by making the edges of the signals sinusoidal. It has also been proposed to produce this sine shape digitally by means of a programmed connection of different voltage steps and subsequent filtering through a low-pass filter.

U.S. Pat. No. 4,075,564 discloses a binary coding of signals which is relatively insensitive to transmission disturbances, wherein solely pulses of the same length are used, and wherein the two binary digits are formed by a small space and a large space between the pulses.

In installations where a binary coded signal need only be transmitted between two points, the apportionment of equipment expenditure between the transmission and receiving ends is of no great importance. If, on the other hand, there are a transmitter and a number of receivers, an effort must be made to keep the equipment at the receiving end as simple as possible.

It is an object of this invention to provide a system whereby a binary coded signal can be transmitted by radio with adequate insensitivity to disturbances, with a small bandwidth in comparison to the speed of transmission, and with relatively simple equipment at the receiving end.

A further object of this invention is to provide such a system utilizing the mentioned technique for saving on bandwidth and the special code described above.

To this end, in the system according to the present invention, of the type initially mentioned, the circuit means at the transmission end are designed in such a way as to convert a binary digit of one kind, supplied to this circuitry, into a single, complete sinusoidal oscillation of a first frequency, and to convert a binary digit of the other kind, supplied to this circuitry, into a sequence consisting of an oscillation packet of a second frequency and a single, complete oscillation of the first frequency. The second frequency is a multiple greater than three of the first frequency, and the single oscillation exhibits the same shape in all cases. The system further comprises a series-arrangement at the receiving end, consisting of a low-pass filter and a threshold-value detector, for converting the output signal from the limiter into a binary signal. The low-pass filter has a critical frequency situated between the aforementioned first and second frequencies, and the threshold-value detector suppresses the first half of each single oscillation. The series arrangement consequently produces a signal consisting of a pulse train having pulses corresponding to the duration of a semi-oscillation of the first frequency and having pulse separations corresponding either to the duration of a semi-oscillation of the first frequency or to the sum of the durations of an oscillation packet of the second frequency and a semi-oscillation of the first frequency.

A preferred embodiment of the invention will now be described in detail with reference to the accompanying drawings, in which:

FIGS. 1 and 2 are block diagrams of those parts of a transmitter and a receiver, respectively, which are associated with the invention, FIG. 3 is a series of graphs illustrating the different signals supplied to the components shown in FIGS. 1 and 2, transmitted by these components, and occurring during processing, as a function of the time, and FIG. 4 is a graph, on a larger scale than FIG. 3, showing the formation of a sinusoidal signal digitally.

A memory 100 in FIG. 1 contains the binary coded information to be transmitted, which has been stored there by means not shown and is assumed to be the five bits 10110. A control unit 102 causes a parallel-serial-converter 101 to apply the potentials corresponding to the stored bits, one after the other, to its output 103. An inverter 104 inverts the values of the bits so that they are passed on directly by an AND-gate 105 but with inverted values by an AND-gate 106. A monostable multivibrator 107 has a time constant at least as long as that of a monostable multivibrator 108, the two time constants preferably being equal.

Multivibrators 107 and 108 control two AND-gates 109 and 110. Multivibrator 107 is enabled solely via AND-gate 105, while multivibrator 108 is enabled both via AND-gate 106 and by multivibrator 107 when the latter is reset. A pulse generator 111 delivers a pulse train which is supplied to a sine-wave pulse shaper 113 both directly via AND-gate 109 and also via a frequency divider 112 and AND-gate 110. On the basis of twelve successive pulses supplied to it, sine shaper 113 produces digitally a stepped signal approximating a sinusoidal signal. The mode of operation of sine shaper 113 is illustrated in FIG. 4. Three positive and three negative potentials of differing magnitudes, plus the zero potential, are successively applied at intervals determined by the pulse train supplied via one of the AND-gates 109 or 110, and these potentials yield oscillations whose frequency corresponds to one-twelfth the frequency of the respective pulse train. A division ratio of 1:4 is assumed for frequency divider 112, and thus the frequencies of the sinusoidal signals produced are also in a ratio of 1:4. This ratio has been chosen in the present example only so that FIGS. 3 and 4 may be more readily understood; in practice, however, it is preferable to use a higher ratio, e.g., 1:16. Suitable frequencies for these sinusoidal signals have proved to be about 80 c/s for the lower frequency and sixteen times that figure, i.e., about 1280 c/s, for the higher frequency.

As shown in FIG. 4, single complete oscillations must be produced from the lower frequency. For this purpose, the time constant of monostable multivibrator 108 must correspond exactly to the duration of twelve pulses delivered by frequency divider 112. Hence, instead of the multivibrators, it is preferable to use counters which count in each case a specific number of the pulses supplied by pulse generator 111 or frequency divider 112. Multivibrators are shown only in order that the operating principle may be better explained.

Frequency divider 112 and sine-wave pulse shaper 113 must be synchronized so that as soon as multivibrator 108 is set, the formation of the sinusoidal signal having a rising edge starting from zero can commence. This synchronization is effected, via the indicated arrows, for frequency divider 112 from multivibrator 108 and for sine shaper 113 from control unit 102.

The signal produced by sine-wave pulse shaper 113, illustrated in FIG. 4, is then rounded in a low-pass filter 114. Line 114 of FIG. 3 shows this signal, which is further processed in a manner unconnected with the present invention.

The part of the receiver illustrated in FIG. 2 comprises a comparator 201 acting as a limiter, to which a signal 211 coming from a discriminator (not shown) and corresponding to the output signal of low-pass filter 114 is supplied. Comparator 201 delivers a potential 212, positive or negative depending upon the polarity of the voltage applied between its inputs and independent of the magnitude of the input voltage. In the absence of an input voltage, its output potential is indefinite. Output signal 212 is supplied to a low-pass filter 202 whose critical frequency is between the two transmitted frequencies and is preferably approximately twice the lower frequency. The output signal of low-pass filter 202, which is a bipolar wave train containing only single oscillations of the lower frequency, is supplied to a Schmitt trigger 203 acting as a threshold-value detector. In this threshold-value detector 203, rectangular pulses are formed from the parts of the aforementioned signal having a specific polarity, and these rectangular pulses appearing at output 214 of detector 203 are further processed in two differentiators 204 and 205.

Differentiator 204 produces a pulse on the basis of the leading edge of a pulse supplied to it, whereas differentiator 205 produces such a pulse as a function of the trailing edge. The pulse produced by differentiator 205 enables a monostable multivibrator 206 whose time constant is approximately the same as that of multivibrators 107 and 108 and whose time starts running again whenever it is enabled while set. A serial-parallel-converter 207 receives a signal over a connection 209 when multivibrator 206 is reset, and a sync signal is applied to serial-parallel-converter 207 by differentiator 204.

As has already been explained, it is assumed that the binary number 10110 to be transmitted has been stored in memory 100. At output 103 of parallel-serial-converter 101 there appears in the non-operative state—as may also be seen in FIG. 3—the binary digit 0, whereas binary 1 thus appears at the output of inverter 104.

In response to a control command applied to an input 115, control unit 102 first applies a pulse to AND-gates 105 and 106 over a connection 116, thereby causing a start signal, independent of the binary number to be transmitted, to be produced. Thus, via AND-gate 106, multivibrator 108 is enabled, which causes a wave train to be produced in a manner to be explained below. When multivibrator 108 is reset, it delivers via a connection 117 a pulse which causes control unit 102 to give parallel-serial-converter 101, via a connection 118, the command to apply to its output 103 the first binary digit to be transmitted.

Control unit 102 then enables AND-gates 105 and 106 again via connection 119. The first binary digit to be transmitted, "1", now causes multivibrator 107 to be enabled via AND-gate 105, and when multivibrator 107 is reset, it enables multivibrator 108. When the latter is reset, it in turn causes control unit 102 to process the next binary digit as has already been described above. This next digit is "0", which, like the start signal, causes the enabling of multivibrator 108.

To recapitulate, multivibrator 108 alone is always enabled for binary "0" whereas first multivibrator 107 and then multivibrator 108 are enabled for binary "1". Hence the time intervals of the control pulses supplied by control unit 102 over connections 118 and 116 are not equal.

As long as multivibrator 107 remains set, it causes the pulse train generated by pulse generator 111 to arrive via AND-gate 109 at sine-wave pulse shaper 113 where—as has been explained above with reference to FIG. 4—together with low-pass filter 114 a sinusoidal signal having one-twelfth the pulse frequency of pulse generator 111 is produced. On the other hand, as long as multivibrator 108 remains set, sine shaper 113 receives via frequency divider 112 and AND-gates 110 a reduced pulse frequency and accordingly delivers a sinusoidal signal having a frequency reduced by the division ratio of frequency divider 112. In each case, sine shaper 113 is adjusted via a connection 119 in such a way that the oscillation packets produced always start at zero and follow the same course.

The signal transmitted by the circuit arrangement shown in FIG. 1 is illustrated in line 114 of FIG. 3. It is a sequence of oscillations of high and low frequency. After a single oscillaion of the lower frequency, serving as a starting signal, binary "1" is represented by a sequence of four oscillations of the higher frequency and one oscillation of the lower, whereas binary "0" is formed by just one oscillation of the lower frequency. It is therefore decisive for the binary digit transmitted whether two low-frequency oscillations immediately follow one another (=binary 00) or whether they are separated by a packet of higher-frequency oscillations (=binary 01). The signal leaving filter 114 is now modulated upon a carrier, in a manner not shown, and is transmitted. This transmitted signal is received by a receiver and demodulated, the demodulated signal being represented in line 211 of FIG. 3. In order to be able to portray clearly the cooperation among the various parts and hence their interdependence, the short pulses have been made excessively wide and thus some of the switching times excessively long in FIG. 3. This explains the demarcations appearing between certain oscillations in lines 114 and 211 of FIG. 3; because of the negligible duration of the pulses and switching times, there are actually no such "gaps" at all.

Signal 211 at the receiving end is supplied to the input of comparator 201. At its output 212 there appears a rectangular signal which agrees in periods and polarity with the signal applied at input 211, but the amplitude of which is independent of the transmission path between the transmitter and the receiver and of the gain of the amplifiers disposed in the transmitter and in the receiver. This rectangular signal, illustrated in line 212 of FIG. 3, having irregular pulse trains caused by noise before it begins and after it ends, is supplied to low-pass filter 202, at the output 213 of which only the slow oscillations with rounded shapes appear. Threshold-value detector 203, to which this signal is supplied, responds only to the negative potentials contained therein which exceed a certain limit, and from these potentials it thus forms rectangular pulses as shown in line 214 of FIG. 3. The length of these pulses therefore corresponds to the duration of a semi-oscillation of the lower frequency, and the spaces between the pulses correspond either likewise to a semi-oscillation of the lower frequency or to the sum of the durations of an oscillation packet of the higher frequency and a semi-oscillation of the lower frequency. Provided that multivibrators 107 and 108 have the same time constant, the spaces between the pulses are either approximately the same width as the pulses or three times as wide, a pulse preceded by a short separation representing binary "0", and a pulse preceded by a long separation representing binary "1".

The pulses are now supplied to the two differentiators 204 and 205. Via differentiator 205, the trailing edge of each pulse enables multivibrator 206, which has a time constant of about one and one-half times a pulse width, whereas a sync signal is supplied to serial-parallel-converter 207 via differentiator 204 with every leading edge. In response to each pulse produced by differentiator 204, a binary digit is read into serial-parallel-convertor 207, viz., binary "0" when multivibrator brator 206 is set at that moment and binary "1" when it is reset. The first pulse produced by the differentiator as a starting pulse is disregarded. Thus, when reception of the signals has been concluded, the binary digits 10110 have appeared at outputs 208 of serial-parallel-convertor 207, corresponding to the binary number stored in memory 100 at the transmission end. The initializing of serial-parallel-converter 207 and the further processing of the binary digits has no connection with the present invention and is therefore not described.

The rapid, i.e., higher-frequency sinusoidal signal, which is formed by direct action of pulse generator 111 on sine-wave pulse shaper 113 and which is subsequently filtered out again by low-pass filter 202, is necessary in connection with the use of a comparator as limiter because if this comparator did not receive any signal at all between two slow, i.e., lower-frequency sinusoidal signals, it would constantly deliver a potential of just any polarity, so that a zero potential would not be certain to appear at the output of threshold-value detector 203.

As follows from the foregoing, the evaluation arrangement at the receiving end as described, having a low-pass filter and a threshold-value detector, allows much simpler evaluation of binary signals transmitted with the aid of sinusoidal oscillations than is possible with conventional frequency-shift keying (FSK) in which two relatively close-lying frequencies are used. Moreover, the elaborateness of the equipment used at the transmitting end remains within the bounds of what is conventional in the art.

What is claimed is:

1. A system for transmitting a binary coded signal by radio, of the type having circuit means at the transmission end for converting said binary coded signal into a signal suitable for modulation upon a radio-frequency signal, and circuit means at the receiving end for demodulating said radio-frequency signal and for supplying said demodulated signal to a limiter for producing a bipolar signal dependent upon the momentary polarity of the signal applied thereto, wherein the improvement comprises:

circuitry included in said circuit means at the transmission end for converting a binary digit of one kind supplied thereto into a single, complete sinusoidal oscillation of a first frequency and for converting a binary digit of the other kind supplied to said circuitry into a sequency consisting of an oscillation packet of a second freqence and a said single, complete oscillation of said first frequency; and means at the receiving end for converting the output signal from said limiter into a binary signal.

2. The system of claim 1, wherein said second frequency is a multiple greater than three of said first frequency, each said single, complete sinusolidal oscillation of said first frequency exhibiting the same shape.

3. The system of claim 2, wherein said circuitry included in said circuit means at the transmission end comprises a pulse generator, a frequency divider, and a sine-wave pulse shaper.

4. The system of claim 2, wherein said converting means at the receiving end comprises a series arrangement including a low-pass filter and a threshold-value detector for converting the output signal of said limiter into a binary signal.

5. The system of claim 4, wherein said low-pass filter has a critical frequency between said first frequency and said second frequency, said threshold-value detector being adapted to suppress the first half of each said single, complete sinusoidal oscillation of said first frequency, whereby said series arrangement produces a signal consisting of a pulse train having pulses corresponding to the duration of a semi-oscillation of said first frequency and having pulse separations corresponding either to the duration of a semi-oscillation of said first frequency or to the sum of the durations of a said oscillation packet of said second frequency and a semi-oscillation of said first frequency.

6. A system for transmitting a binary coded signal by radio, of the type having circuit means at the transmission end for converting said binary coded signal into a signal suitable for modulation upon a radio-frequency signal, and circuit means at the receiving end for demodulating said radio-frequency signal including a limiter for producing a bipolar signal dependent upon the momentary polarity of the signal applied thereto, wherein the improvement comprises the combination of:

circuitry included in said circuit means at the transmission end for converting a binary digit of one kind supplied thereto into a single, complete sinusoidal oscillation of a first frequency and for converting a binary digit of the other kind supplied to said circuitry into a sequence consisting of an oscillation packet of a second frequency and a said single, complete oscillation of said first frequency, said second frequency being a multiple greater than three of said first frequency and each said single, complete sinusoidal oscillation of said first frequency exhibiting the same shape;

further circuitry at the receiving end for converting the output signal from said limiter into a binary signal;

a low pass filter in said further circuitry, with a critical frequency between said first frequency and said second frequency;

a threshold-value detector in said further circuitry, arranged in series with said low pass filter and being adapted to suppress the first half of each said single, complete sinusoidal oscillation of said first frequency, whereby said series arrangement produces a signal consisting of a pulse train having pulses corresponding to the duration of a semi-oscillation of said first frequency and having pulse separations corresponding either to the duration of a semi-oscillation of said first frequency or to the sum of the durations of a said oscillation packet of said second frequency and a semi-oscillation of said first frequency.

* * * * *